United States Patent
Sasaki

(10) Patent No.: US 6,396,227 B2
(45) Date of Patent: May 28, 2002

(54) DRIVER SIDE WATERPROOF POWER WINDOW APPARATUS PERMITTING OPERATION OF MULTIPLE WINDOWS WHEN SUBMERGED

(75) Inventor: Akira Sasaki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/757,682

(22) Filed: Jan. 9, 2001

(30) Foreign Application Priority Data

Jan. 17, 2000 (JP) ........................................ 2000-008055

(51) Int. Cl.$^7$ .............................. H02P 1/00; H02P 1/22; H02P 1/40; H02P 3/00; H02P 3/20
(52) U.S. Cl. ........................ 318/283; 307/10.1; 180/281
(58) Field of Search ................................ 318/280, 282, 318/283; 307/10.1; 180/281

(56) References Cited

U.S. PATENT DOCUMENTS

| | | | | |
|---|---|---|---|---|
| 5,547,208 A | * | 8/1996 | Chappell et al. | ........ 307/10.1 X |
| 5,949,207 A | * | 9/1999 | Luebke et al. | ............... 318/446 |
| 6,060,794 A | | 5/2000 | Takagi et al. | |
| 6,072,290 A | | 6/2000 | Takagi et al. | |
| 6,111,373 A | * | 8/2000 | Ohashi | ........................ 318/265 |
| 6,157,152 A | * | 12/2000 | Sekine et al. | ................ 318/266 |
| 6,201,363 B1 | * | 3/2001 | Miyazawa | ................... 318/283 |
| 6,246,564 B1 | * | 6/2001 | Sugiura et al. | |
| 6,278,250 B1 | * | 8/2001 | Sasaki | |
| 6,281,647 B1 | * | 8/2001 | Sasaki | |

* cited by examiner

Primary Examiner—Jeffrey Donels
(74) Attorney, Agent, or Firm—Brinks Hofer Gilson & Lione

(57) ABSTRACT

A waterproof power window apparatus comprises: a driver-seat switch unit; an other-seat switch unit; and a bus line allowing communication to be established between the driver-seat switch unit and the other-seat switch unit. The driver-seat switch unit has: a first controller; a first driving unit for opening and closing a window at the driver seat in a window-sliding operation; an other-seat-window-opening and closing switch; a first submergence-detecting unit; and a first power-supply unit connected to the bus line and provided with a control terminal connected to the first control unit and the first submergence-detecting unit. The other-seat switch unit has: a second control unit; a second driving unit for opening and closing an other-seat window in a window-sliding operation; a second submergence-detecting unit; and a second power-supply unit connected to the bus line and provided with a control terminal connected to the second control unit and the second submergence-detecting unit.

3 Claims, 4 Drawing Sheets

DRIVER SIDE WATERPROOF POWER WINDOW APPARATUS PERMITTING OPERATION OF MULTIPLE WINDOWS WHEN SUBMERGED

BACKGROUND OF THE INVENTION

1. Field of the Invention

The present invention relates to a waterproof power window apparatus. More particularly, the present invention relates to a waterproof power window apparatus wherein, when the car submerges, a submergence-detecting unit provided in one of switch units detects the submergence, or the apparatus which is capable of opening a window at a seat other than the driver seat by operating the other-seat window opening switch provided in a driver-seat switch unit if a signal cannot be transmitted through a bus line.

2. Description of the Related Art

In general, a power window apparatus comprises a driver-seat switch unit, a front-passenger-seat switch unit, a left-rear-seat switch unit and a right-rear-seat switch unit. The driver-seat switch unit is connected to each of the other switch units, namely, the front-passenger-seat switch unit, the left-rear-seat switch unit and the right-rear-seat switch unit by a bus line. At normal times, communication signals such as control signals are transmitted through the bus lines.

FIG. 4 is a block diagram showing a typical configuration of main components composing a commonly known power window apparatus.

As shown in FIG. 4, the power window apparatus comprises a driver-seat switch unit 41, a front-passenger-seat switch unit 42, a left-rear-seat switch unit 43, a right-rear-seat switch unit 44, a first bus line 45 (1) connecting the driver-seat switch unit 41 to the front-passenger-seat switch unit 42, a second bus line 45 (2) connecting the driver-seat switch unit 41 to the left-rear-seat switch unit 43 and a third bus line 45 (3) connecting the driver-seat switch unit 41 to the right-rear-seat switch unit 44.

The driver-seat switch unit 41 comprises a control unit (CPU) 46, a motor-driving unit 47, a window-opening and closing motor 48, a driver-seat-window-opening and closing switch 49, a front-passenger-seat-window-opening and closing switch 50, a left-rear-seat-window-opening and closing switch 51, a right-rear-seat-window-opening and closing switch 52, a first interface (I/F) unit 53 and a second interface (I/F) unit 54. The motor-driving unit 47 comprises a relay-driving unit 47A and a window-opening and closing relay 47B. In the driver-seat switch unit 41, the control unit 46, the motor-driving unit 47, the window-opening and closing motor 48, the driver-seat-window-opening and closing switch 49, the front-passenger-seat-window-opening and closing switch 50, the left-rear-seat-window-opening and closing switch 51, the right-rear-seat-window-opening and closing switch 52, the first interface unit 53 and the second interface unit 54 are connected to each other as shown in FIG. 4.

The front-passenger-seat switch unit 42, the left-rear-seat switch unit 43 and the right-rear-seat switch unit 44 each include components such as a control unit, a motor-driving unit, a front-passenger-seat, left-rear-seat or right-rear-seat-window-opening and closing motor, a front-passenger-seat, left-rear-seat or right-rear-seat-window-opening and closing switch and an interface unit. Since the front-passenger-seat switch unit 42, the left-rear-seat switch unit 43 and the right-rear-seat switch unit 44 are commonly known components of a power window apparatus of this type, they are not shown in FIG. 4.

The operation of the commonly known power window apparatus having the configuration described above is explained briefly as follows.

When the driver operates a window-opening switch of the driver-seat-window-opening and closing switch 49 employed in the driver-seat switch unit 41, the motor-driving unit 47 is driven by the operation of the window-opening switch, rotating the window-opening and closing motor 48 in a certain direction, that is, the window-opening direction in this case. As a result, the window at the driver seat is moved in the opening direction. When the driver operates a window-closing switch of the driver-seat-window-opening and closing switch 49, on the other hand, the motor-driving unit 47 is driven by the operation of the window-closing switch, rotating the window-opening and closing motor 48 in the other direction, that is, the window-closing direction in this case. As a result, the window at the driver seat is moved in the closing direction.

When the driver operates the front-passenger-seat-window-opening and closing switch 50 employed in the driver-seat switch unit 41 in the opening direction, the control unit 46 senses the operation and outputs a window-opening-operation signal to the first bus line 45 (1) by way of the second I/F unit 54. The window-opening-operation signal is transmitted to the control unit of the front-passenger-seat switch unit 42 through the first bus line 45 (1). The control unit drives components such as the motor-driving unit to rotate the motor. As a result, the window at the front-passenger seat is moved in the opening direction. When the driver operates the front-passenger-seat-window-opening and closing switch 50 employed in the driver-seat switch unit 41 in the closing direction, on the other hand, the control unit 46 senses the operation and outputs a window-closing-operation signal to the first bus line 45 (1) by way of the second I/F unit 54. The window-closing-operation signal is transmitted to the control unit of the front-passenger-seat switch unit 42 through the first bus line 45 (1). The control unit drives components such as the motor-driving unit to rotate the motor. As a result, the window at the front-passenger seat is moved in the closing direction.

When the driver operates the left-rear-seat switch unit 43 or the right-rear-seat switch unit 44, almost the same operation as the front-passenger-seat-window-opening and closing switch 50 is carried out. As a result, the window at the left-rear seat or the window at the right-rear seat is moved in the opening or closing direction in accordance with the direction of the operation of the left-rear-seat switch unit 43 or the right-rear-seat switch unit 44 respectively.

In addition, there is also provided a commonly known power window apparatus having the so-called submergence-problem-solving means including a submergence-detecting unit provided at least in the driver-seat switch unit, the front-passenger-seat switch unit, the left-rear-seat switch unit or the right-rear-seat switch unit of the power window apparatus in order to prevent any of the switch units from becoming not operative normally due to some reasons such as submergence of the car causing water to flow to the inside of the car and to the switch units. To put it concretely, a submergence-detecting unit is provided to keep a window-opening switch of a switch unit operating normally or to prevent the window-opening switch from becoming incapable of opening the window even if the switch is operated.

Since the conventional power window unit does not have a submergence-detecting unit on any of the switch units, when water flows to the inside of the car and, hence, to the driver-seat switch unit, the front-passenger-seat switch unit, the left-rear-seat switch unit or the right-rear-seat switch unit, an insulator of the wet switch unit is broken so that a normal window operation can no longer be accomplished even if the opening and closing switch of the switch unit with a broken insulator is operated. That is to say, even if a passenger of the car operates the opening and closing switch of the switch unit near at hand, the window associated with the switch unit can not be opened so that it is feared that an action of the passenger to escape from the submerging car will be too late.

In the case of a power window apparatus having the submergence-problem solving means described above, a submergence-detecting unit is provided at least in the driver-seat switch unit, the front-passenger-seat switch unit, the left-rear-seat switch unit or the right-rear-seat switch unit so that, when water flows to the inside of the car and, hence, to the driver-seat switch unit, the front-passenger-seat switch unit, the left-rear-seat switch unit or the right-rear-seat switch unit, the submergence-detecting unit provided on the switch unit prevents the opening and closing switch employed in the switch unit from becoming inoperative so that, if a passenger of the car operates the opening and closing switch of the switch unit near at hand, the window associated with the switch unit will be opened, allowing the passenger to escape from the submerging car to the outside of the car through the opened window.

When water flows to the inside of the car causing the driver-seat switch unit to be submerged in the water, however, the operation of the control unit employed in the switch unit becomes abnormal in the first place due to the water. As a result, the driver-seat switch unit is no longer capable of normally transmitting an operation signal to switch units for the other seats through bus lines. In consequence, a window-opening control signal cannot be transmitted to another switch unit even if the driver operates the window-opening switch on the driver-seat switch unit for the window associated with the other switch unit. Thus, the window associated with the other switch unit cannot be opened by operating the driver-seat switch unit. As a result, an action of the passengers other than the driver to escape from the submerging car may be too late.

SUMMARY OF THE INVENTION

It is thus an object of the present invention addressing the problems described above to provide a waterproof power window apparatus capable of immediately opening the window of any other seat when a window-opening switch provided on a driver-seat switch unit for the window is operated without regard to a state of submergence of the car.

A waterproof power window apparatus provided by the present invention comprises a driver-seat switch unit, an other-seat switch unit and a bus line allowing communication to be established between the driver-seat switch unit and the other-seat switch unit, wherein: the driver-seat switch unit has a first controller, a first driving unit for opening and closing a window at the driver seat in a window-sliding operation, an other-seat-window-opening and closing switch, a first submergence-detecting unit and a first power-supply unit connected to the bus line and provided with a control terminal connected to the first control unit and the first submergence-detecting unit; and the other-seat switch unit has a second control unit, a second driving unit for opening and closing an other-seat window in a window-sliding operation, a second submergence-detecting unit and a second power-supply unit connected to the bus line and provided with a control terminal connected to the second control unit and the second submergence-detecting unit.

Configured as described above, the waterproof power window apparatus supplies a power-supply voltage to the other-seat switch unit to open the window at another seat associated with the other-seat switch unit when the driver operates an other-seat-window-opening switch of the other-seat-window-opening and closing switch provided on the driver-seat switch unit even if the driver-seat switch unit is submerged. Thus, a passenger sitting at the other seat other than the driver seat is capable of escaping from the submerging car early.

In addition, in the waterproof power window apparatus described above, the first power-supply unit enters a conductive state when the first submergence-detecting unit detects submergence, and supplies a power-supply voltage to the other-seat switch unit through the bus line when the other-seat-window-opening and closing switch is operated in a window-opening direction; and the second control unit puts the second power-supply unit in a conductive state allowing the power-supply voltage to be supplied to the second driving unit when detecting the power-supply voltage supplied to the other-seat switch unit.

Configured as described above, the waterproof power window apparatus allows a window at the other seat to be opened from the driver-seat switch unit even if the driver-seat switch unit is submerged so that passengers including the driver are capable of escaping from the submerging car through a window at another seat not submerged yet.

Moreover, in the waterproof power window apparatus described above, when the second submergence-detecting unit detects submergence, the second control unit terminates the communication with the first control unit through the bus line and puts the second power-supply unit in a conductive state connecting the second driving unit to the bus line; and when the first control unit detects termination of the communication, the first control unit puts the first power-supply unit in a conductive state and, when the other-seat-window-opening and closing switch is operated in a window-opening direction, the first control unit allows a power-supply voltage to be supplied to the second driving unit through the bus line.

Configured as described above, the waterproof power window apparatus allows a window at the other seat to be opened when the driver operates the other-seat-window-opening switch of the other-seat-window-opening and closing switch provided on the driver-seat switch unit since the bus line for supplying a power-supply voltage from the driver-seat switch unit to the other-seat switch unit is driven to an active state even if the other-seat switch unit is submerged. Thus, a passenger sitting at the seat other than the driver seat is capable of escaping from the submerging car.

DETAILED DESCRIPTION OF THE PREFERRED EMBODIMENTS

A preferred embodiment of the present invention is explained by referring to the accompanying diagrams.

Figure 1:
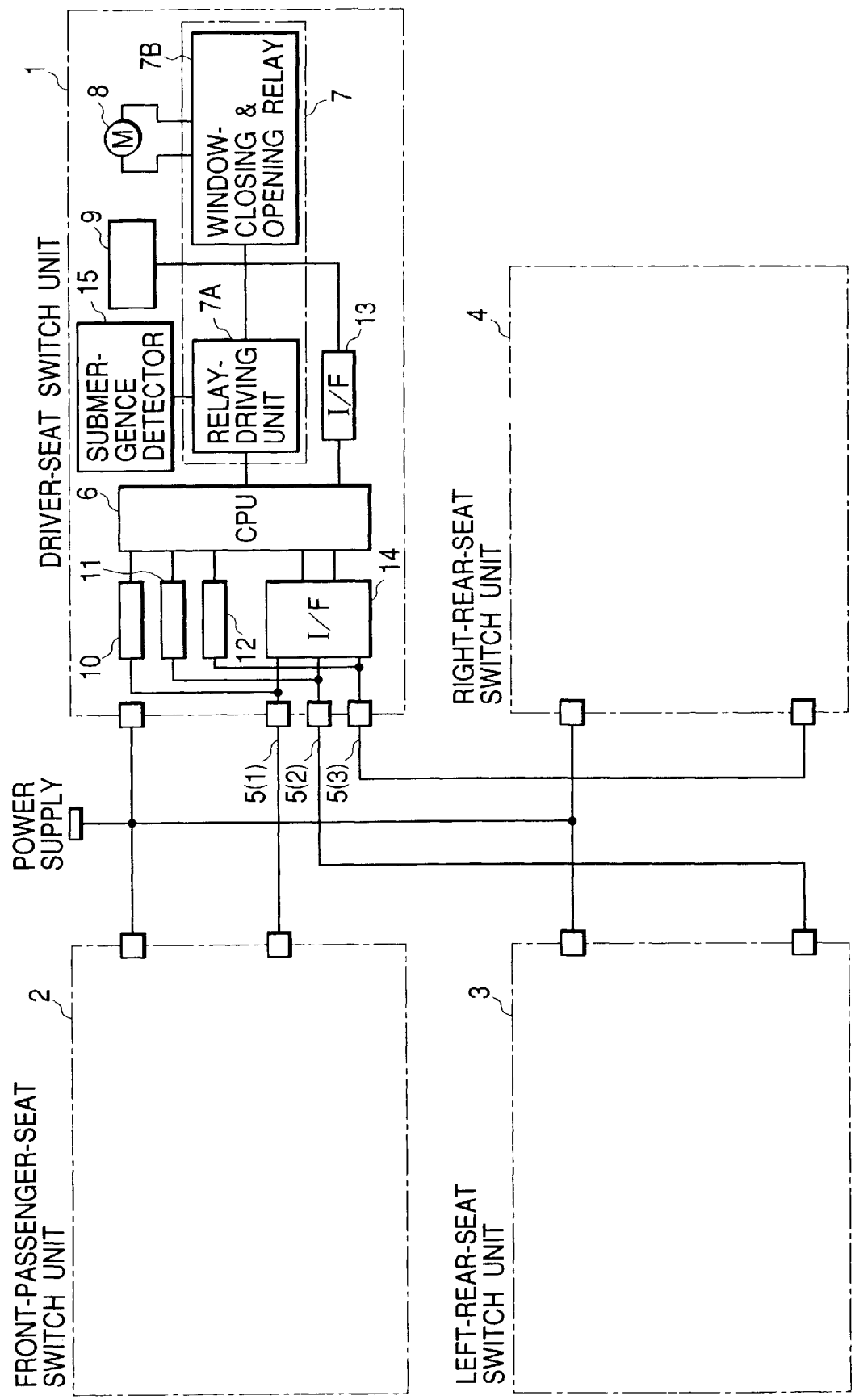
FIG. 1 is a block diagram showing a configuration of main components composing an embodiment implementing a waterproof power window provided by the present invention.

FIG. 1 is a block diagram showing a configuration of main components composing an embodiment implementing a waterproof power window provided by the present invention.

As shown in FIG. 1, the waterproof power window implemented by the embodiment comprises a driver-seat switch unit 1, a front-passenger-seat (another-seat) switch unit 2, a left-rear-seat (another-seat) switch unit 3, a right-rear-seat (another-seat) switch unit 4, a first bus line 5 (1) connecting the driver-seat switch unit 1 to the front-passenger-seat switch unit 2, a second bus line 5 (2) connecting the driver-seat switch unit 1 to the left-rear-seat switch unit 3 and a third bus line 5 (3) connecting the driver-seat switch unit 1 to the right-rear-seat switch unit 4.

The driver-seat switch unit 1 comprises a control unit (a CPU or a first control unit) 6, a motor-driving unit (a first driving unit) 7, a window-opening and closing motor 8, a driver-seat-window-opening and closing switch 9, a front-passenger-seat-window-opening and closing switch (another-window-opening and closing switch) 10, a left-rear-seat-window-opening and closing switch (another-window-opening and closing switch) 11, a right-rear-seat-window-opening and closing switch (another-window-opening and closing switch) 12, a first interface (I/F) unit 13, a second interface (I/F) unit 14 and a submergence-detecting unit (first submergence-detecting unit) 15. The motor-driving unit 7 comprises a relay-driving unit 7A and a window-opening and closing relay 7B. In the driver-seat switch unit 1, the control unit 6, the motor-driving unit 7, the relay-driving unit 7A, the window-opening and closing relay 7B, the window-opening and closing motor 8, the driver-seat-window-opening and closing switch 9, the front-passenger-seat-window-opening and closing switch 10, the left-rear-seat-window-opening and closing switch 11, the right-rear-seat-window-opening and closing switch 12, the first interface unit 13, the second interface unit 14 and the submergence-detecting unit 15 are connected to each other as shown in FIG. 1.

Figure 2:
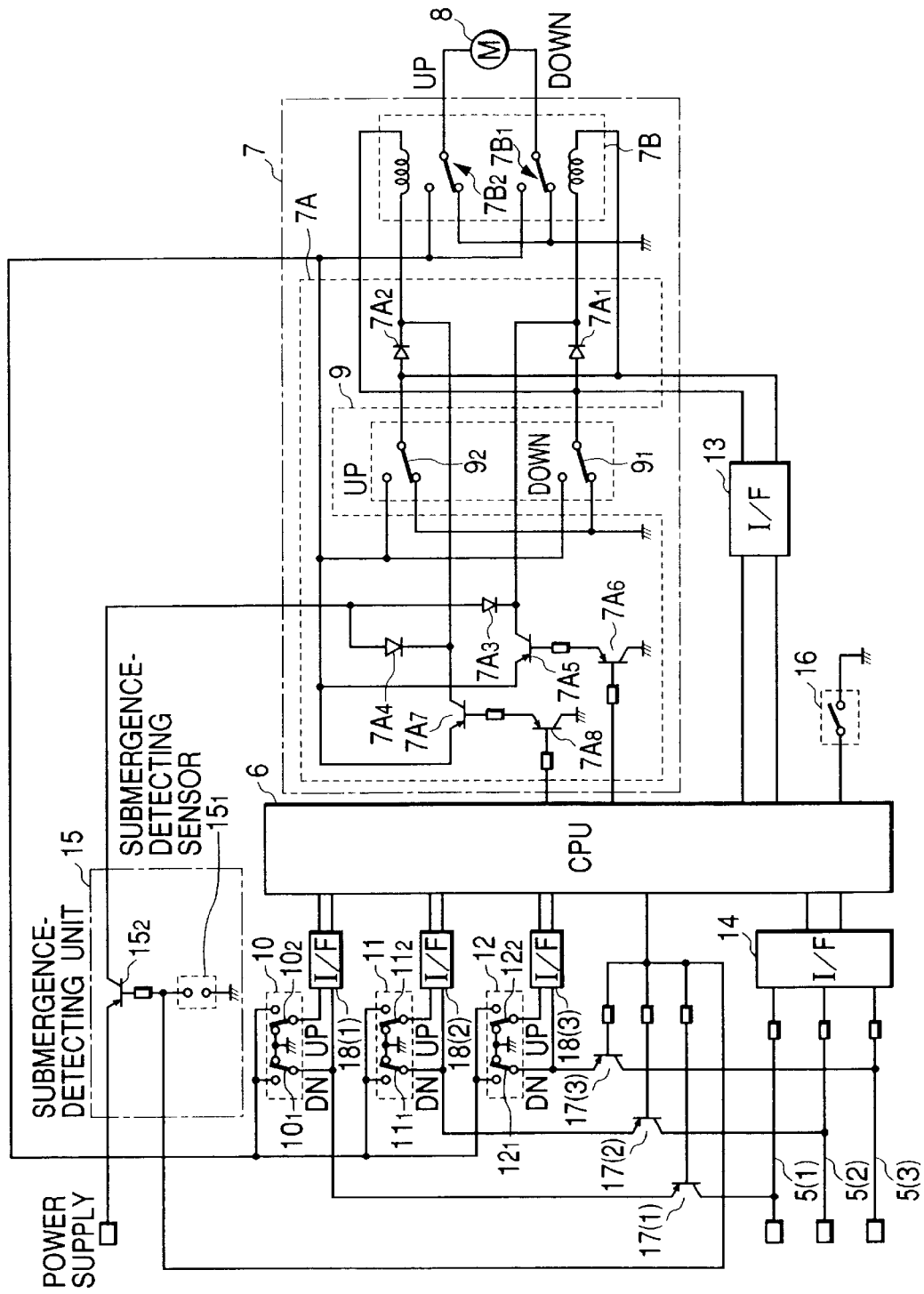
FIG. 2 is a diagram showing a typical detailed configuration of a driver-seat switch unit employed in the waterproof power window apparatus shown in FIG. 1.
Figure 3:
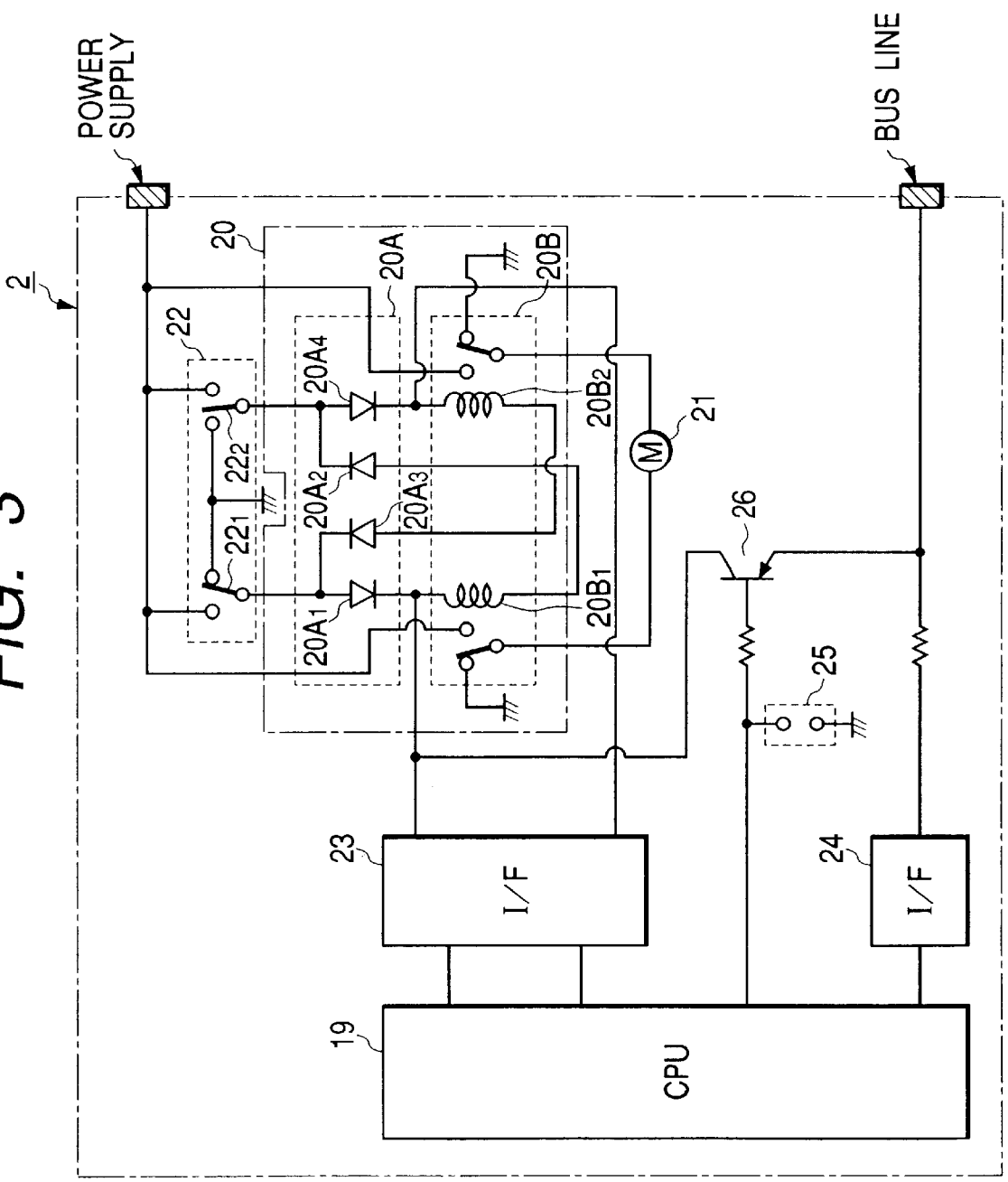
FIG. 3 is a diagram showing a typical detailed configuration of a front-passenger-seat switch unit employed in the waterproof power window apparatus shown in FIG. 1.

FIG. 2 is a diagram showing a typical detailed configuration of the driver-seat switch unit 1 employed in the waterproof power window apparatus shown in FIG. 1. FIG. 3 is a diagram showing a typical detailed configuration of the front-passenger-seat switch unit 2 employed in the waterproof power window apparatus shown in FIG. 1. It should be noted that elements of the driver-seat switch unit 1 shown in FIG. 2 and the front-passenger-seat switch unit 2 shown in FIG. 3 that are identical with those shown in FIG. 1 are denoted by the same reference numerals as the latter.

As shown in FIG. 2, the relay driving unit 7A employed in the driver-seat switch unit 1 comprises a first diode $7A_1$, a second diode $7A_2$, a third diode $7A_3$, a fourth diode $7A_4$, a first transistor $7A_5$, a second transistor $7A_6$, a third transistor $7A_7$ and a fourth transistor $7A_8$. The window-opening and closing relay 7B comprises a window-opening relay $7B_1$ and a window-closing relay $7B_2$. The driver-seat-window-opening and closing switch 9 comprises a window-opening switch $9_1$ and a window-closing switch $9_2$. By the same token, the front-passenger-seat-window-opening and closing switch 10 comprises a window-opening switch $10_1$ and a window-closing switch $10_2$. Similarly, the left-rear-seat-window-opening and closing switch 11 comprises a window-opening switch $11_1$ and a window-closing switch $11_2$. Likewise, the right-rear-seat-window-opening and closing switch 12 comprises a window-opening switch $12_1$ and a window-closing switch $12_2$. The submergence-detecting unit 15 comprises a submergence-detecting sensor $15_1$ and a submergence-detecting transistor $15_2$. The configuration elements $7A_1$ to $7A_8$, $7B_1$ and $7B_2$, $9_1$ and $9_2$, $10_1$ and $10_2$, $11_1$ and $11_2$ and $12_1$ and $12_2$ are connected to each other as shown in FIG. 2.

In addition, the driver-seat switch unit 1 includes an auto switch 16, three power-supply transistors (a first power-supply unit) 17(1), 17(2) and 17(3) and three third interface units 18(1), 18(2) and 18(3). The auto switch 16 is connected to the control unit 6. The emitter and the collector of the power-supply transistor 17 (1) are connected to the window-opening switch $10_1$ and the first bus line 5 (1) respectively. The base (control terminal) of the power-supply transistor 17 (1) is connected to the control unit 6 and the submergence-detecting sensor $15_1$ by a resistor. In the same way, the emitter and the collector of the power-supply transistor 17 (2) are connected to the window-opening switch $11_1$ and the second bus line 5 (2) respectively whereas the base (control terminal) is connected to the control unit 6 and the submergence-detecting sensor $15_1$ by a resistor. Similarly, the emitter and the collector of the power-supply transistor 17 (3) are connected to the window-opening switch $12_1$ and the third bus line 5 (3) respectively whereas the base (control terminal) is connected to the control unit 6 and the submergence-detecting sensor $15_1$ by a resistor. The third interface unit 18 (1) is connected between the front-passenger-seat-window-opening and closing switch 10 and the control unit 6. Similarly, the third interface unit 18 (2) is connected between the left-rear-seat-window-opening and closing switch 11 and the control unit 6. Likewise, the third interface unit 18 (3) is connected between the right-rear-seat-window-opening and closing switch 12 and the control unit 6.

In addition, as shown in FIG. 3, the front-passenger-seat switch unit 2 comprises a control unit (a CPU or a second control unit) 19, a motor-driving unit (a second driving unit) 20, a window-opening and closing motor 21, a front-passenger-seat-window-opening and closing switch 22, a first interface (I/F) unit 23, a second interface (I/F) unit 24, a submergence-detecting sensor (a second submergence-detecting unit) 25 and a power-supply transistor (a second power-supply unit) 26. The motor-driving unit 20 comprises a relay-driving unit 20A and a window-opening and closing relay 20B. The relay-driving unit 20A comprises four diodes $20A_1$, $20A_2$, $20A_3$ and $20A_4$. The window-opening and closing relay 20B comprises a window-opening relay $20B_1$ and a window-closing relay $20B_2$. The front-passenger-seat-window-opening and closing switch 22 comprises a window-opening switch $22_1$ and a window-closing switch $22_2$. The configuration elements 19 to 26, 20A, $20A_1$ to $20A_4$, 20B, $20B_1$, $20B_2$, $22_1$ and $22_2$ are connected to each other as shown in FIG. 3.

The operation of the waterproof power window implemented by the embodiment with the configuration described above is described as follows.

Figure 4:
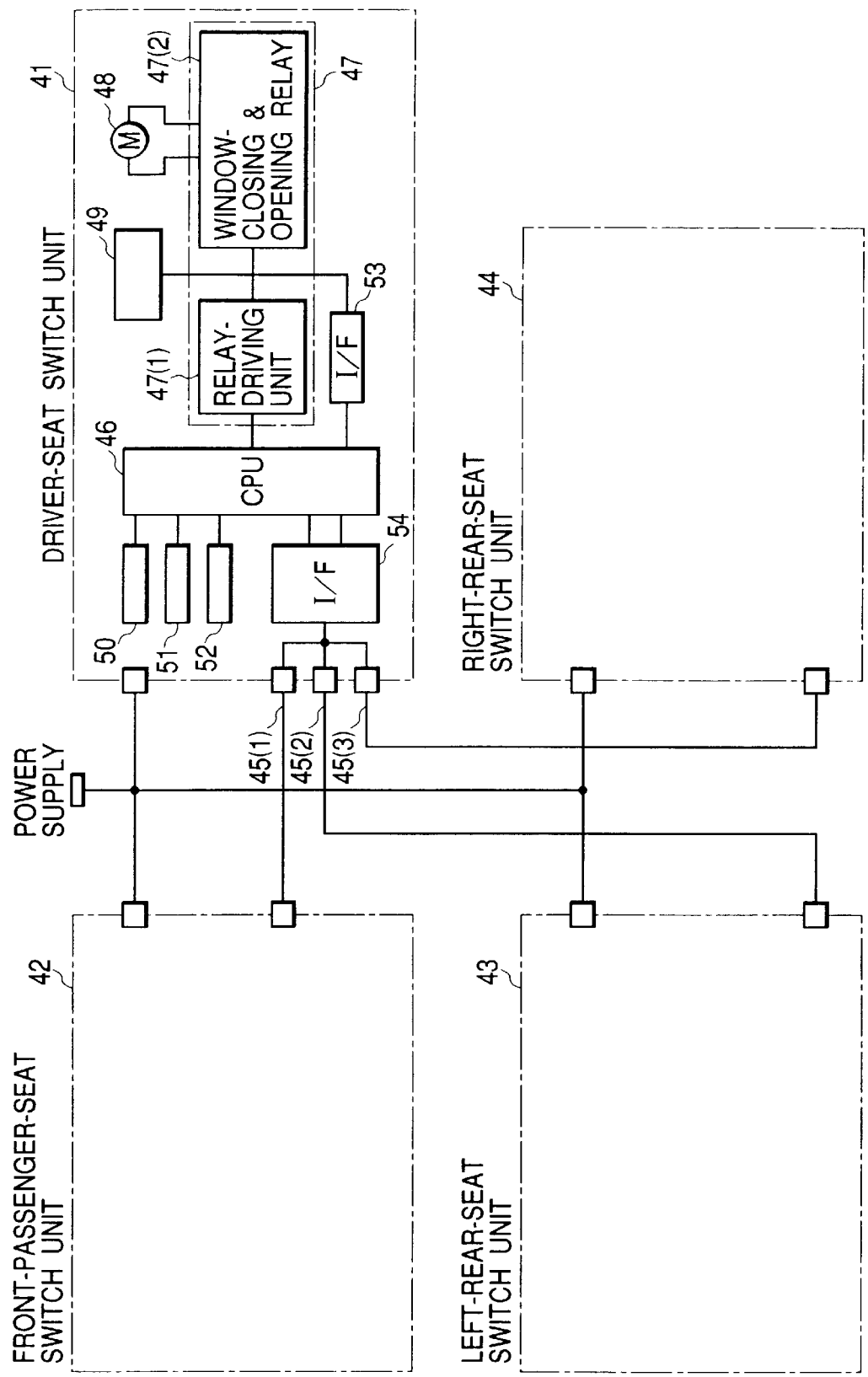
FIG. 4 is a block diagram showing a typical configuration of main components composing a commonly known power window apparatus.

In a normal operating state with no water flowing to the inside of the car, when any one of the driver-seat-window-opening and closing switch 9, the front-passenger-seat-window-opening and closing switch 10, the left-rear-seat-window-opening and closing switch 11 and the right-rear-seat-window-opening and closing switch 12, which are employed in the driver-seat switch unit 1, is operated, the waterproof power window apparatus implemented by the embodiment operates in the same way as the operation is carried out by the conventional power window apparatus shown in FIG. 4 when any one of the driver-seat-window-opening and closing switch 49, the front-passenger-seat-window-opening and closing switch 50, the left-rear-seat-window-opening and closing switch 51 and the right-rear-seat-window-opening and closing switch 52, which are employed in the driver-seat switch unit 41, is operated respectively. Thus, it is not necessary to repeat the explanation of the operation, which is carried out by the waterproof power window apparatus implemented by the embodiment when any one of the driver-seat-window-opening and closing switch 9, the front-passenger-seat-window-opening and closing switch 10, the left-rear-seat-window-opening and closing switch 11 or the right-rear-seat-window-opening and closing switch 12, which are employed in the driver-seat switch unit 1, is operated. For this reason, the following description begins with explanation of an operation, which is carried out when water flows to the inside of the car.

When the car submerges, causing water to flow to the inside of the car, the water also flows to the inside of the driver-seat switch unit 1 shown in FIG. 2. In this case, when the submergence-detecting sensor 151 employed in the submergence-detecting unit 15 is submerged, a low resistance is resulted in between both the ends of the submergence-detecting sensor $15_1$, putting the submergence-detecting transistor $15_2$ in a conductive state. When the submergence-detecting transistor $15_2$ conducts, a power-supply voltage is applied to one-side ends of the coils of both the window-opening relay $7B_1$ and the window-closing relay $7B_2$ by way of the submergence-detecting transistor $15_2$, the third diode $7A_3$ and the fourth diode $7A_4$, driving both the relay coils at the same time. Thus, the window-opening relay $7B_1$ and the window-closing relay $7B_2$ are switched to contact points opposite to the state shown in FIG. 2. Since the power-supply voltage is applied to both the terminals of the window-opening and closing motor 8 in this state, the window-opening and closing motor 8 does not rotate.

When the driver operates the driver-seat-window-opening switch $9_1$ at that time, the driver-seat-window-opening switch $9_1$ is changed over to a contact point opposite to the state shown in FIG. 2. In this state, the power-supply voltage is supplied to both the terminals of the coil of the window-opening relay $7B_2$, switching the coil of the window-opening relay $7B_2$ to a contact point opposite to the state shown in FIG. 2. Since one terminal of the window-opening and closing motor 8, that is, the upper-side terminal shown in FIG. 2, is connected to the ground, the window-opening and closing motor 8 rotates in a certain direction, sliding the window at the driver seat to the opening direction. Thus, the driver is capable of escaping from the submerging car by way of the opened window.

If the driver operates the window-opening switch 10 of the front-passenger-seat-window-opening and closing switch 10 employed in the driver-seat switch unit 1 at that time, the window-opening switch $10_1$ is changed over to a movable-state contact point opposite to the state shown in FIG. 2. In this state, the power-supply voltage is supplied to the emitter of the power-supply transistor 17 (1) by way of the movable-state contact point of the window-opening switch $10_1$. At the same time, a voltage close the ground voltage is supplied to the base (control terminal) of the power-supply transistor 17 (1) by way of the submergence-detecting sensor $15_1$, which has become a resistor having a low resistance. Thus, a conductive state is generated between the emitter and the collector of the power-supply transistor 17 (1), allowing the power-supply voltage to be supplied to the first bus line 5 (1). The power-supply voltage is passed on to the front-passenger-seat switch unit 2 through the first bus line 5 (1).

As shown in FIG. 3, in the front-passenger-seat switch unit 2, the power-supply voltage supplied to the front-passenger-seat switch unit 2 through the first bus line 5 (1) is fed to the control unit 19 by way of the emitter of the power-supply transistor 26 and the second interface unit 24. At that time, the control unit 19 lowers a voltage applied to the base (control terminal) of the power-supply transistor 26 to a level close to the ground voltage in response to the power-supply voltage supplied thereto. As a result, a conductive state is established between the emitter and the collector of the power-supply transistor 26, allowing the power-supply voltage to be supplied to the motor-driving unit 20. The power-supply voltage supplied to the motor-driving unit 20 causes a current to flow to the ground by way of the coil of the window-opening relay $20B_1$, the diode $20A_2$ and a contact point of the window-closing switch $22_2$, switching the window-opening relay $20B_1$ to contact point opposite to the state shown in FIG. 3. In this state, the power-supply voltage is applied to one terminal, a terminal on the left side shown in FIG. 3, of the window-opening and closing motor 21. Thus, the window-opening and closing motor 21 rotates in a direction, sliding the window at the front-passenger seat in the opening direction. As a result, the front passenger is capable of escaping from the submerging car through the opened window.

If the driver operates the window-opening switch $11_1$ of the left-rear-seat-window-opening and closing switch 11 employed in the driver-seat switch unit 1, the power-supply voltage is supplied to the left-rear-seat switch unit 3 through the second bus line 5 (2) in exactly the same way as the operation of the window-opening switch $10_1$ of the front-passenger-seat-window-opening and closing switch 10 employed in the driver-seat switch unit 1. The power-supply voltage is applied to the left-rear-seat switch unit 3 slides the window at the left-rear seat in the opening direction in exactly the same way as the operation carried out in response to the application of the power-supply voltage to the front-passenger-seat switch unit 2. Similarly, if the driver operates the window-opening switch $12_1$ of the right-rear-seat-window-opening and closing switch 12 employed in the driver-seat switch unit 1, the power-supply voltage is supplied to the right-rear-seat switch unit 4 through the third bus line 5 (3) in exactly the same way as the operation of the window-opening switch $10_1$ of the front-passenger-seat-window-opening and closing switch 10 employed in the driver-seat switch unit 1. The power-supply voltage is applied to the right-rear-seat switch unit 4 slides the window at the right-rear seat in the opening direction in exactly the same way as the operation carried out in response to the application of the power-supply voltage to the front-passenger-seat switch unit 2. As a result, the left-rear-seat passenger and right-rear-seat passenger are capable of escaping from the submerging car through the opened window.

The above description explains operations for a case in which water flows first to the driver-seat switch unit 1. However, the explanation also applies as well to other cases in which water flows first to the switch unit 2, 3 or 4 instead of the driver-seat switch unit 1. That is to say, the window associated with any one of the window-opening and closing switches 9 to 12 can be opened by similar operations.

Assume that water flows first to the front-passenger-seat switch unit 2. In this case, the submergence-detecting sensor 25 employed in the front-passenger-seat switch unit 2 is submerged, resulting in a low resistance between the terminals of the submergence-detecting sensor 25. When the submergence-detecting sensor 25 exhibits a low resistance, a conductive state is established between the emitter and the collector of the power-supply transistor 26. The control unit 19 senses this state and halts transmission of an operation signal from the front-passenger-seat switch unit 2 to the driver-seat switch unit 1 through the first bus line 5 (1).

At that time, as the control unit 6 detects the suspension of the transmission of an operation signal through the first bus line 5 (1) for a duration exceeding a predetermined period of time, a voltage close to the ground potential, that is, a low-level voltage, is applied to the bases (control terminals) of the power-supply transistors 17 (1), 17 (2) and 17 (3). With a low-level voltage applied to the bases (control terminals) of the power-supply transistors 17 (1), 17 (2) and 17 (3), a conductive state is established between the emitter and the collector of each of the power-supply transistors 17 (1), 17 (2) and 17 (3) as is the case with the submergence-detecting sensor $15_1$ submerging into water and becoming a resistor with a low resistance. In this state, if the driver operates the window-opening switch $10_1$ of the front-passenger-seat-window-opening and closing switch 10 employed in the driverseat switch unit 1, the power-supply voltage is supplied to the front-passenger-seat switch unit 2 through the first bus line 5 (1), opening the window at the front-passenger seat. In the same way, if the driver operates the window-opening switch $11_1$ of the left-rear-seat-window-opening and closing switch 11 employed in the driver-seat switch unit 1, the power-supply voltage is supplied to the left-rear-seat switch unit 3 through the second bus line 5 (2), opening the window at the left-rear seat. Similarly, if the driver operates the window-opening switch $12_1$ of the right-rear-seat-window-opening and closing switch 12 employed in the driver-seat switch unit 1, the power-supply voltage is supplied to the right-rear-seat switch unit 4 through the third bus line 5 (3), opening the window at the right-rear seat. Likewise, if the driver operates the window-opening switch 91 of the driver-seat-window-opening and closing switch 9 employed in the driver-seat switch unit 1, the power-supply voltage is supplied to the driver-seat switch unit 1, opening the window at the driver seat in the same way as a normal operation due to the fact that the driver-seat switch unit 1 has not been submerged yet.

If the left-rear-seat switch unit 3 or the right-rear-seat switch unit 4 is submerged first, operations are carried out in the same way as the operations performed for the front-passenger-seat switching unit 2 submerged first to allow a window at a seat associated with any operated one of the window-opening and closing switches 9 to 12 to be opened.

As described above, in accordance with the waterproof power window apparatus implemented by the embodiment, due to inclusion of the submergence-detecting unit 15 and the power-supply transistors 17 (1) to 17 (3) in the driver-seat switch unit 1, an operation of any one of the other-seat-window-opening and closing switches 10, 11 and 12 provided in the driver-seat switch unit 1 causes a power-supply voltage to be supplied to the other-seat switch unit 2, 3 or 4 through the bus line 5 (1), 5 (2) or 5 (3) respectively, allowing a window at another seat associated with the other-seat switch unit 2, 3 or 4 to be opened. As a result, any passengers at the other seats are also capable of escaping from the submerging car in addition to the driver.

The embodiment described above exemplifies a case in which the front-passenger-seat switch unit 2, the left-rear-seat switch unit 3 and the right-rear-seat switch unit 4 have the same configuration including the power-supply transistor 26 and the submergence-detecting sensor 25. It should be noted, however, that not all the front-passenger-seat switch unit 2, the left-rear-seat switch unit 3 and the right-rear-seat switch unit 4 need to have the same configuration including the power-supply transistor 26 and the submergence-detecting sensor 25. Any of them may have a configuration not including the power-supply transistor 26 and the submergence-detecting sensor 25.

As described above, in accordance with the present invention, a driver-seat switch unit includes a first submergence-detecting unit and a first power-supply unit whereas at least one other-seat-switch unit includes a second submergence-detecting unit and a second power-supply unit. In such a configuration, an operation of an other-seat-window-opening switch provided in the driver-seat switch unit will cause a power-supply voltage to be supplied to the other-seat-switch unit through a bus line and allow a window associated with the other-seat-switch unit to be opened, exhibiting an effect of allowing any passenger at a seat other than the driver's seat to escape from the submerging car at an early time.

What is claimed is:

1. A waterproof power window apparatus comprising:
   a driver-seat switch unit;
   an other-seat switch unit; and
   a bus line allowing communication to be established between the driver-seat switch unit and the other-seat switch unit, wherein:
   the driver-seat switch unit has:
      a first control unit that controls communication between the first control unit and at least the other-seat switch unit;
      a first driving unit controlled by the first control unit and for opening and closing a window at the driver seat in a window-sliding operation;
      an other-seat-window-opening and closing switch connected with the first control unit;
      a first submergence-detecting unit; and
      a first power-supply unit connected to the bus line and provided with a control terminal connected to the first control unit and the first submergence-detecting unit; and
   the other-seat switch unit has:
      a second control unit that controls communication between the second control unit and at least the driver-seat switch unit;
      a second driving unit controlled by the second control unit and for opening and closing an other-seat window in a window-sliding operation;
      a second submergence-detecting unit; and
      a second power-supply unit connected to the bus line and provided with a control terminal connected to the second control unit and the second submergence-detecting unit.

2. A waterproof power window apparatus according to claim 1 wherein:
   when the first submergence-detecting unit detects submergence, the first submergence-detecting unit puts the first power-supply unit in a conductive state, and supplies a power-supply voltage to the other-seat switch unit throught the bus line when the other-seat-window-opening and closing switch is operated in a window-opening direction; and
   the second control unit puts the second power-supply unit in a conductive state allowing the power-supply voltage to be supplied to the second driving unit when detecting the power-supply voltage supplied to the other-seat switch unit.

3. A waterproof power window apparatus according to claim 1 wherein:
   when the second submergence-detecting unit detects submergence, the second control unit terminates the communication with the first control unit through the bus line and puts the second submergence-detecting unit puts the second power-supply unit in a conductive state connecting the second driving unit to the bus line; and when the first control unit detects termination of the communication, the first control unit puts the power-supply unit in a conductive state and, when the other-seat-window-opening and closing switch is operated in a window-opening direction, the first control unit allows a power-supply voltage to be supplied to the second driving unit through the bus line.

* * * * *

UNITED STATES PATENT AND TRADEMARK OFFICE
CERTIFICATE OF CORRECTION

PATENT NO. : 6,396,227 B1
DATED : May 28, 2002
INVENTOR(S) : Akira Sasaki

It is certified that error appears in the above-identified patent and that said Letters Patent is hereby corrected as shown below:

<u>Column 10,</u>
Line 55, delete "throught" and substitute -- through -- in its place.

Signed and Sealed this

Twenty-fifth Day of March, 2003

JAMES E. ROGAN
*Director of the United States Patent and Trademark Office*